Oct. 16, 1956  J. H. DAHLBERG  2,766,477
MACHINES FOR DRESSING POULTRY
Filed Jan. 21, 1953  3 Sheets-Sheet 1
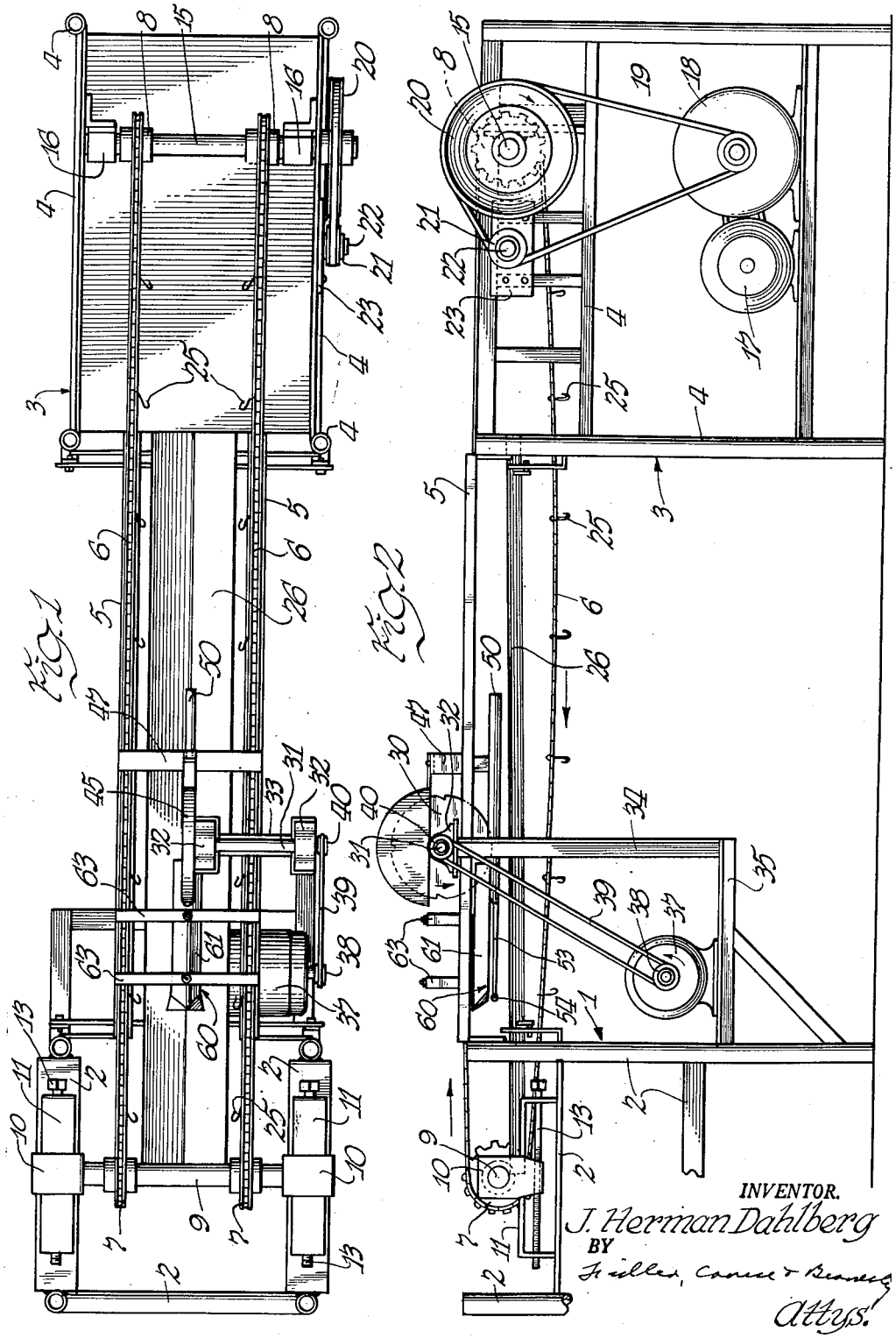
INVENTOR.
J. Herman Dahlberg
BY
Fidler, Canute & Beavers
attys.

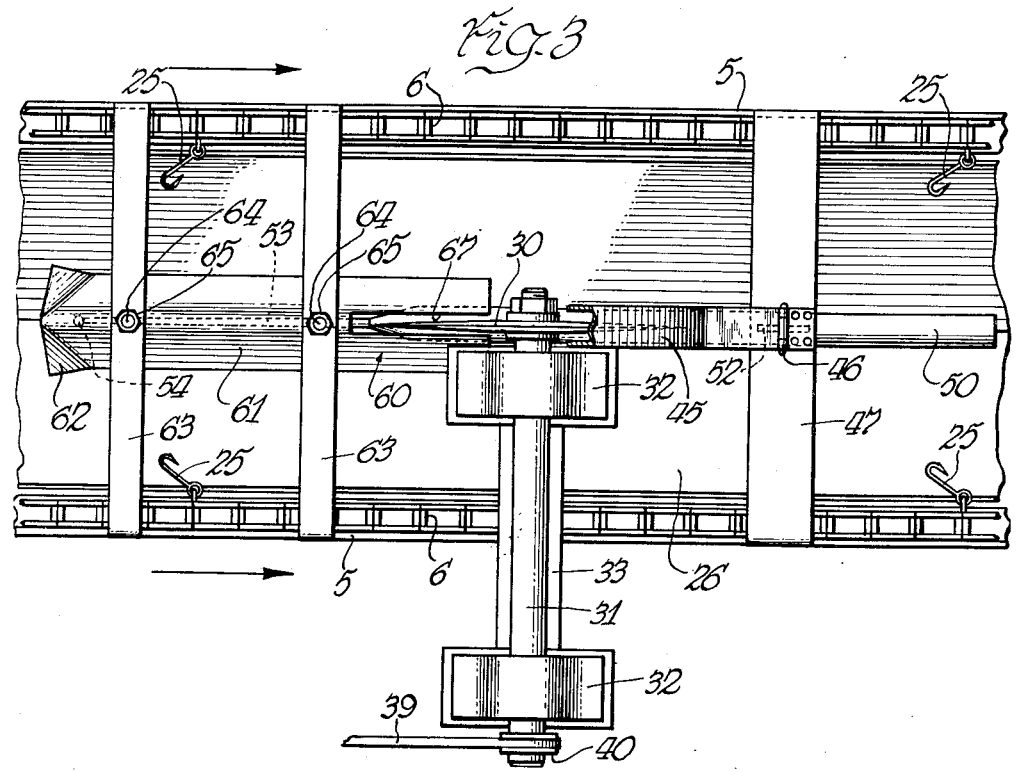
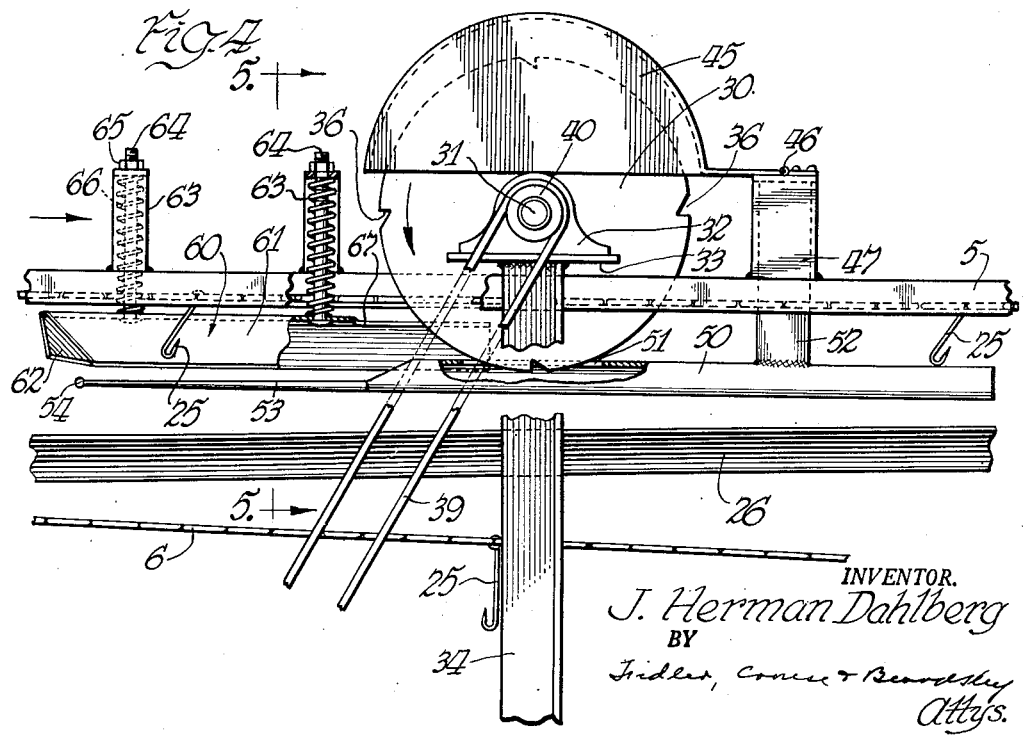

Oct. 16, 1956 J. H. DAHLBERG 2,766,477
MACHINES FOR DRESSING POULTRY
Filed Jan. 21, 1953 3 Sheets-Sheet 3
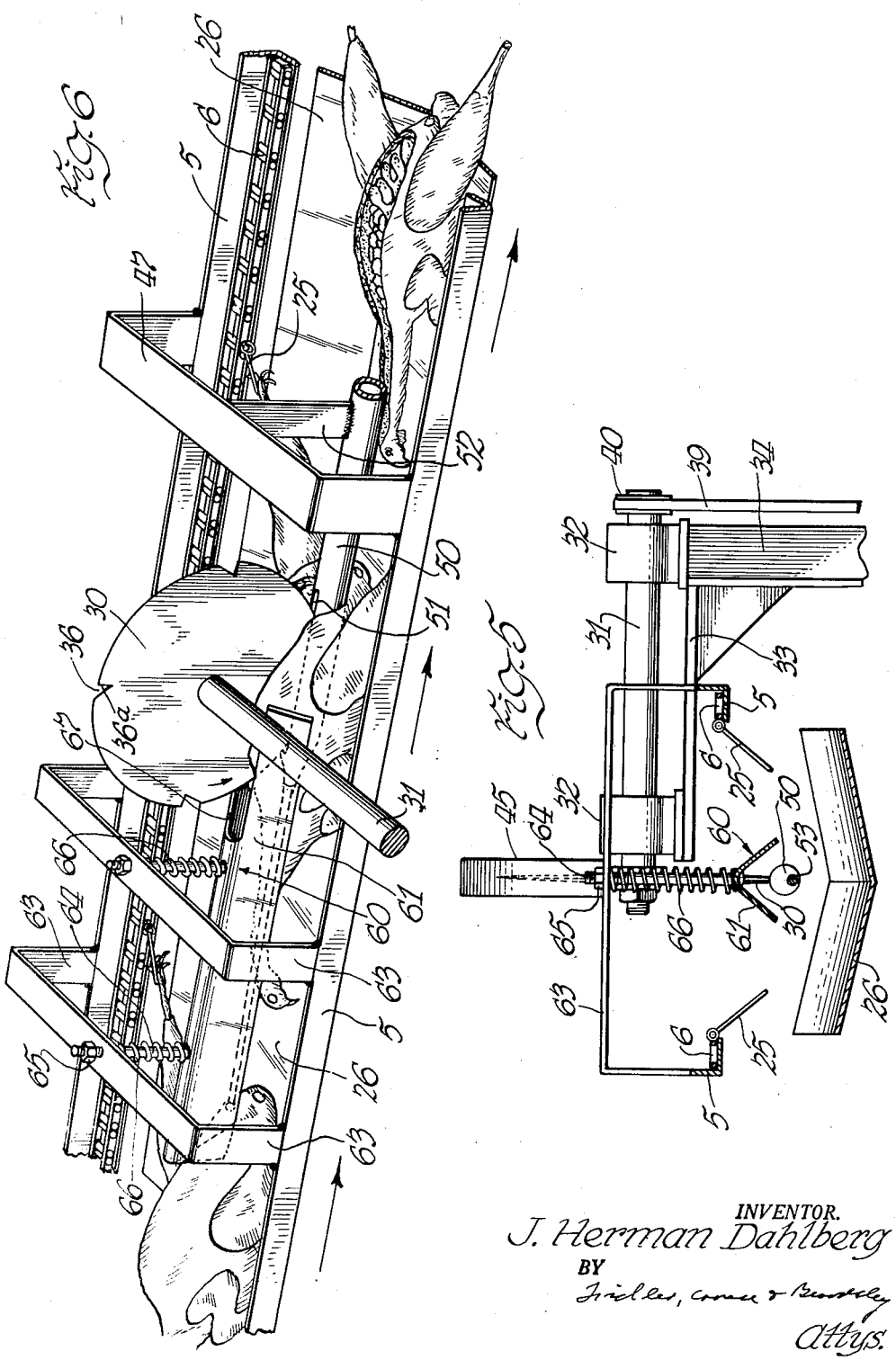
INVENTOR.
J. Herman Dahlberg
BY
attys.

United States Patent Office 2,766,477
Patented Oct. 16, 1956

2,766,477
MACHINES FOR DRESSING POULTRY

John Herman Dahlberg, Omaha, Nebr., assignor to C. A. Swanson & Sons, Omaha, Nebr., a corporation of Nebraska Application January 21, 1953, Serial No. 332,214

15 Claims. (Cl. 17—11)

This invention relates to machines for dressing poultry and other food animal carcasses and has to do more particularly with a machine for cutting open the breast of a fowl carcass or the belly of a meat animal to permit removal of the viscera. The invention also relates to a novel method for cutting open the breast of a fowl carcass or the belly of a meat animal.

In dressing poultry, it is customary to split open the breast from the vent to the neck in order to remove the viscera. This operation has heretofore been performed manually and is time-consuming and expensive. Moreover, unless considerable care is exercised in making the cut, the carcass may be mutilated or the edible viscera, such as the heart, liver and gizzard, may be damaged; whenever either occurs, the fowl or the edible viscera may be rendered unfit for sale. Furthermore, if the alimentary system is damaged, the carcass and edible viscera must be given a special cleaning treatment in order that the edible portions of the carcass and viscera may pass the required inspection.

An object of the present invention is to provide a machine for cutting open the breast of a fowl or the belly of a meat animal carcass.

Another object is to provide a machine for cutting open the breast of a fowl or the belly of a meat animal carcass to expose the viscera without cutting into or otherwise injuring the viscera.

Another object is to provide a machine for cutting open the breast of a fowl or the belly of a meat animal carcass to expose the viscera, which machine is fully automatic in operation and capable of being operated at a comparatively high production rate.

A further object is to provide a conveyor for poultry and food animals which advances the fowl or animal carcass along a predetermined path and firmly and accurately supports the same in the desired position for one or more dressing operations to be performed thereon either mechanically or manually.

A still further object is to provide a machine for automatically conveying a fowl or animal carcass to a station for a dressing operation which presents the carcass in an accurately predetermined position for a dressing operation thereon and conveying the carcass away from the station.

Still another object is to provide a machine wherein a fowl or animal carcass is advanced automatically into engagement with and past a rotary cutting blade and is positively and accurately positioned whereby the breast bone or "keel" bone of the bird carcass or the belly of the animal is slit open to expose the viscera without cutting into the latter.

Other objects and advantages will appear from the following description taken in connection with the appended drawings, wherein:

Figure 1 is a top plan view of a machine constructed in accordance with the invention;

Fig. 2 is a side elevational view of the machine of Fig. 1;

Fig. 3 is an enlarged, fragmentary top plan view of the portion of the machine at the cutter mechanism;

Fig. 4 is an enlarged, fragmentary, side elevational view of the same portion of the machine as shown in Fig. 3;

Fig. 5 is a transverse sectional view taken along line 5—5 of Fig. 4; and

Fig. 6 is a somewhat diagrammatic, fragmentary, perspective view of the portion of the machine at the cutter mechanism and showing several fowl carcasses in process in the machine.

Referring now particularly to Figs. 1 and 2 the illustrated embodiment of the invention includes a frame comprising a forward section 1 formed from a plurality of structural members 2, which may be rods or tubes, for example, suitably connected together as by welding and a rearward section 3 formed in a generally similar fashion. The two frame sections are suitably connected as by conveyor guides 5 which may be formed of angle irons which are supported in spaced, parallel relation by the frame sections 1 and 3.

A conveyor is provided for conveying fowl carcasses past a cutting station which conveyor comprises a pair of spaced, parallel, continuous chains 6 of suitable form and which comprise links and rollers as shown particularly in Fig. 4. Each chain 6 is trained over a sprocket 7 adjacent the entrance end of the machine and a sprocket sprocket 8 adjacent the discharge end of the machine. The two sprockets 7 at the forward end of the machine are carried on a shaft 9 journaled in bearing blocks 10 at either side of the machine, each of which is slidably supported for longitudinal adjusting movement on a guide 11 which in turn is carried on a horizontal support 12 connected between two upright frame members 2. An adjusting screw 13 extendes through the legs of the U-shaped guide 11 and is threaded into the bearing block 10 for the purpose of adjusting the bearing block 10 in a longitudinal direction. Suitable manipulation of the adjusting screws 13 permits adjustment of the tightness of the chains 6.

The chains 6 and particularly their upper flights are supported and guided by the conveyor guides 5, and at the discharge end of the machine are trained around the sprockets 8 respectively. The sprockets 8 are rigidly carried by a drive shaft 15 journaled in bearings 16 rigidly supported by the rearward section 3. The shaft 15 is driven from a motor 17 suitably connected thereto through a gear reduction unit 18 which drives a drive belt 19 trained around a drive pulley 20 fixed to the shaft 15. An idler pulley 21 is carried on a stub shaft 22 journaled in a bearing block 23 adjustable on the frame section 3 for adjusting the tension of the belt. Energization of the motor 17 causes the pulley 20 to be rotated which causes driving movement of the two chains 6 in the direction indicated by the arrows in Fig. 2. If desired, the drive from the motor 17 may comprise sprockets and chains in lieu of pulleys and belts.

Carried by the chains 6 are a series of longitudinally spaced shackles 25 which take the form of hooks adapted to engage the legs of the fowl carcasses just above the feet, as illustrated somewhat diagrammatically in Fig. 6. The chains 6 are spaced apart a suitable distance so that when fowl carcasses of ordinary sizes are conveyed by the chains the legs are spread apart somewhat in order to present the carcasses suitably to the cutting mechanism and to prevent interference with the splitting or cutting operation hereinafter described. The longitudinal spacing of the hooks 25 preferably is such that the fowl carcasses are spaced along the conveyor a distance sufficient to permit cutting or splitting of each carcass without interference of the other but which distance preferably is such that a maximum number of carcasses may be processed in any given operating time for any particular speed of the conveyor.

The carcasses carried by the conveyor chains are supported and are guided along their path of movement by a bottom guide or floor 26 which takes the form of a generally upwardly open V-shaped trough extending from the vicinity of the shaft 9 to the forward portion of the rear frame section 3. The floor may if desired terminate at a point just rearwardly of or even under the cutting mechanism. The bottom guide 26 is upwardly inclined from the entrance end to the discharge end of the machine, as shown particularly in Fig. 2 of the drawings. From the foregoing it will be seen that each carcass may be attached to the conveyor chains by engaging a pair of corresponding hooks 25 with the respective legs of the carcass, the carcass being disposed on the bottom guide in breast up position.

The cutting or splitting mechanism (shown in detaill in Figs. 3 and 4) includes a metal cutting blade 30 which preferably is of circular form and is rotatably carried by a shaft 31 extending transversely of the machine and journaled in blocks 32 carried on an arm 33 suitably supported as by the corresponding frame member 5 and a supporting post 34 upstanding from a shelf 35 carried by the frame 1.

The blade 30 is provided with one or more, and preferably four, notches 36 in its periphery, the notches preferably being of such form as to provide a radially arranged rear edge 36a. The notches thus provide, in effect, teeth which serve to split the keel bone of the fowl carcass.

The blade shaft 31 is driven at a suitable speed by a driving motor 37 suitably connected to the shaft 31 by a drive such as one including a pulley 38 on the motor shaft, a belt 39 and a pulley 40 on the blade shaft 31. Alternatively, the motor may drive the shaft through a sprocket and chain drive.

The blade 30 preferably is inclosed at its upper portion in a hood or casing 45 which is hingedly supported as at 46 on a U-shaped crossbar 47 secured on the frame members 5. The hood 45 serves to protect the operator of the machine but may be rocked out of operative position to permit access to the blade.

Disposed under the blade 30 is a blade sheath 50 into which the extreme lower portion of the blade 40 projects. The sheath 50 preferably takes the form of an elongated cylindrical member formed of metal and having a slit 51 of sufficient size to receive the extreme lower portion of the blade with a slight clearance. The sheath 50 preferably is hollow, which prevents the clogging of the slit 51 by foreign material and is open at its rear end which permits the removal of any foreign material which may enter the sheath. The sheath is firmly supported at its rearward portion by a strap 52 secured to and depending from the crossbar 47. The sheath 50 extends in a plane parallel to the plane of the blade and passing centrally of and longitudinally along the machine and is disposed in the path of movement of the fowl carcasses as they pass through the machine.

The sheath 50 is provided at its forward end with a probe 53 having a ball-shaped forward end 54. The probe is positioned so that as a fowl carcass is advanced along the machine by the conveyor, the probe enters the carcass at a point between the vent and the rear end of the keel bone and passes between the viscera and the keel bone.

A top guide 60 is provided for cooperating with the bottom guide 26 in guiding the fowl carcasses appropriately with respect to the probe 53 and the cutting wheel 30. The top guide includes an elongate member 61 of generally inverted V-shaped cross section and having its forward end portion 62 bent outwardly or flared in order to facilitate the entry of the fowl carcass into the guide 60. For the purpose of accommodating fowl carcasses of different shapes and sizes the top guide 60 is yieldably supported, preferably at points near to the forward and rearward portions respectively. Each top guide support includes a U-shaped strap 63 preferably secured to the side rails 5 and adjustably supporting an elongated bolt 64 depending from the support and secured thereon as by a nut 65. A coil spring 66 surrounds the bolt 64 and bears at its two ends against the support 63 and the guide 60 respectively to yieldingly resist upward movement of the guide 60.

The top guide 60 extends rearwardly beyond the forward edge of the cutter blade 30 and to a point rearwardly of the forward portion of the blade sheath 50 to insure that each fowl carcass is effectively guided into proper position for cutting by the cutter blade 30. The rear portion of the top guide 60 is provided with a slot 67 to receive the blade 30.

All of the members of the machine which normally may be contacted by the fowl carcass are formed of material which is not rusted or corroded by such contact. In particular, the bottom guide or trough, the top guide, the probe and sheath, the blade and guard, and the chains and hooks are formed of such material. One material which has been found satisfactory for forming the aforementioned members is stainless steel.

When the machine is to be used to slit open the breast of a fowl carcass, the fowl carcass is attached to the chains by engaging the legs respectively with a corresponding pair of hooks 25 and the carcass disposed on the bottom guide 26, breast upwardly as shown somewhat diagrammatically in Fig. 6 of the drawings. The carcass is advanced along the machine, being supported by the bottom guide 26 and as it approaches the forward end of the probe 53 is engaged by the top or breast guide 60. The guides 26 and 60 serve to position and guide the carcass so that the end 54 of the probe enters the carcass between the vent and the rear end of the keel bone with the probe passing between the viscera and the keel bone. The top guide 60 being free to move upwardly against the resistance of the springs 66 accommodates itself to fowl carcasses of various sizes but it is positioned with a sufficiently positive action to properly guide each carcass as the latter is moved along the bottom guide.

As the carcass is advanced further it is moved into position wherein the cutter blade 30 slits the keel bone and neck of the fowl carcass, as illustrated in Fig. 6. Since the probe has entered the fowl carcass above the viscera, the latter pass under and around the blade sheath 50 and only the keel bone and ventral covering—that is the skin, keel bone and adjacent flesh—passes between the blade sheath 50 and the cutter blade 30 and is cut by the latter. The sheath 50 thus serves to prevent the cutter blade 30 from cutting into any portion of the viscera.

As the carcass is advanced still further it passes under the cutter blade 30 and since it has been slit as above explained, the two halves tend to fall away and pass readily under and away from the blade sheath 50.

Each carcass is removed from the conveyor chains as the carcass reaches the discharge end of the machine and may be removed to a station for further eviscerating operations.

It will be understood that while it is preferable to provide conveyor means for mechanically moving the fowl carcass past the cutting or slitting station, nevertheless, the carcass may be moved manually past such station. In other words, the cutter blade sheath and probe will operate in the same manner whether the fowl carcasses are advanced mechanically or manually. It is desirable however to provide suitable guiding means for positively presenting the carcasses successively to the probe and cutter blade in order that the probe may enter each carcass at the proper point and that the carcass may be positioned properly so that the blade cuts the carcass along the keel bone as above described.

It will be further understood that the machine of the present invention may be installed as a unit or section of a machine having other mechanisms (not shown) for performing other operations on the fowl carcasses, either before or subsequently to the breast slitting operation, or both.

I claim:

1. A machine for cutting open the ventral cavity of a fowl or animal carcass comprising a cutting element, an elongated sheath disposed below said cutting element and receiving the lower portion of said cutting element, a conveyor extending past said cutting element for moving a carcass past said cutting element and into engagement therewith, and guide means extending parallel to said conveyor and past said cutting element for positioning the carcass with respect to said sheath and said cutting element whereby said sheath passes into and through the carcass between the ventral covering and the viscera and said cutting element slits the ventral covering substantially throughout the length of the carcass.

2. A machine for cutting open the ventral cavity of a fowl or animal carcass comprising a cutting element, an elongated sheath disposed below said cutting element and receiving the lower portion of said cutting element, a conveyor extending past said cutting element for moving a carcass past said cutting element and into engagement therewith, and guide means for positioning the carcass with respect to said sheath and said cutting element whereby said blade sheath passes into and through the carcass between the ventral covering and the viscera and said cutting element slits the ventral covering substantially throughout the length of the carcass, said guide means including an upwardly opening, trough-shaped guide member extending past and under said sheath.

3. A machine for cutting open the ventral cavity of a fowl or animal carcass comprising a cutting element, an elongated sheath disposed below said cutting element and receiving the lower portion of said cutting element, a conveyor extending past said cutting element for moving a carcass past said cutting element and into engagement therewith, and guide means for positioning the carcass with respect to said sheath and said cutting element whereby said blade sheath passes into and through the carcass between the ventral covering and the viscera and said cutting element slits the ventral covering substantially throughout the length of the carcass, said guide means including an upwardly opening, trough-shaped bottom guide member extending past and under said sheath, and a downwardly opening, generally trough-shaped member above and extending along at least a portion of said sheath.

4. A machine for cutting open the ventral cavity of a fowl or animal carcass comprising a cutting element, an elongated sheath disposed below said cutting element and receiving the lower portion of said cutting element, an elongate probe element extending forwardly of and in alignment with said sheath, a conveyor extending past said cutting element for moving a carcass past said cutting element and into engagement therewith, guide means extending parallel to said conveyor and past said cutting element for positioning the carcass with respect to said probe element, sheath and cutting element whereby said blade sheath passes into and through the carcass between the ventral covering and the viscera and said cutting element slits the ventral covering substantially throughout the length of the carcass.

5. A machine for splitting the breast of a fowl carcass or the belly of a meat animal carcass comprising a rotary cutter blade, means for rotating said blade, an elongate sheath in alignment with and receiving a portion only of the periphery of said blade, an elongate probe element extending forwardly of and in alignment with said sheath, and means extending past said cutter blade for guiding a carcass past said blade in position whereby said probe and sheath pass into and through the carcass between the ventral covering and the viscera.

6. A machine for splitting the breast of a fowl carcass or the belly of a meat animal carcass comprising a rotary cutter blade, having a plurality of spaced notches in its periphery, means for rotating said blade, an elongate sheath in alignment with and receiving a portion only of the periphery of said blade, an elongate probe element extending forwardly of and in alignment with said sheath, and means extending past said cutter blade for guiding a carcass past said blade in position whereby said probe and sheath pass into and through the carcass between the ventral covering and the viscera.

7. A machine for splitting the breast of a fowl carcass or the belly of a meat animal carcass comprising a rotary cutter blade, means for rotating said blade, an elongate sheath in alignment with and receiving a portion only of the periphery of said blade, an elongate probe element extending forwardly of and in alignment with said sheath, and means extending past said cutter blade for guiding a carcass past said blade in position whereby said probe and sheath pass into and through the carcass between the ventral covering and the viscera.

8. A machine for cutting open the ventral cavity of a fowl or animal carcass comprising a frame, a conveyor mounted on said frame for moving a carcass along a predetermined path, a cutting element mounted on said frame in the path of movement of a carcass on said conveyor and in position to slit the ventral covering substantially throughout the length of the carcass, a guard mounted on said frame in the path of movement of the carcass in position to pass into the carcass between the viscera and the ventral covering of the carcass and to maintain the viscera out of engagement with said cutting element, and guide means mounted on said frame extending along the path of movement of the carcass and past said cutting element for guiding the carcass into engagement with said cutting element and guard.

9. A machine as set forth in claim 8 wherein the cutting element is a rotatably mounted disc-shaped member having a peripheral cutting edge and means connected in driving relation to said cutting element are provided for rotating the latter.

10. A machine as set forth in claim 8 wherein the cutting element is a rotatably mounted disc having a peripheral cutting edge formed with a plurality of spaced notches therein and means connected in driving relation to said cutting element are provided for rotating the latter.

11. A machine as set forth in claim 8, wherein said guide means includes an upwardly opening, generally trough-shaped guide member and a downwardly opening, generally trough-shaped guide member disposed above said upwardly opening guide member.

12. A machine as set forth in claim 11 wherein said downwardly opening, generally trough-shaped member is supported for limited vertical movement and means are provided for resiliently resisting upward movement thereof.

13. A machine as set forth in claim 8 wherein is provided a probe extending forwardly of and in alignment with said guard in position to enter the rear portion of the ventral cavity of a carcass on said conveyor.

14. A machine as set forth in claim 13 wherein the end of said probe is formed as a generally spherical enlarged head.

15. The method of slitting the ventral covering of a poultry or food animal carcass which comprises making a cut longitudinally along the ventral covering to slit the same and open the ventral cavity and simultaneously maintaining in spaced relation to the lower wall of the ventral cavity that portion of the viscera which is in alignment with the cut.

References Cited in the file of this patent

UNITED STATES PATENTS

| | | |
|---|---|---|
| 1,465,866 | Rendlich | Aug. 21, 1923 |
| 1,687,663 | Goldfinger | Oct. 16, 1928 |
| 2,237,203 | Swanson | Apr. 1, 1941 |
| 2,546,750 | Hyman et al. | Mar. 27, 1951 |
| 2,571,811 | Andrews | Oct. 16, 1951 |